United States Patent [19]
Knipe et al.

[11] Patent Number: 5,835,336
[45] Date of Patent: Nov. 10, 1998

[54] COMPLEMETARY RESET SCHEME FOR MICROMECHANICAL DEVICES

[75] Inventors: Richard L. Knipe, McKinney; Duane E. Carter, Plano; Lionel S. White, Dallas, all of Tex.

[73] Assignee: Texas Instruments Incorporated, Dallas, Tex.

[21] Appl. No.: 818,466

[22] Filed: Feb. 24, 1997

[51] Int. Cl.$^6$ .................................................... H02N 13/00
[52] U.S. Cl. ............................................ 361/233; 361/234
[58] Field of Search ..................................... 361/233, 234; 200/181, 404

[56] References Cited

U.S. PATENT DOCUMENTS 5,544,001  8/1996  Ichiya et al. ............................. 361/233
5,677,823  10/1997  Smith ....................................... 361/234

*Primary Examiner*—Fritz Fleming
*Attorney, Agent, or Firm*—Julie L. Reed; Charles A. Brill; Richard L. Donaldson

[57] ABSTRACT

A method of operating a micromechanical device. The device is in a first state. Data for the next state of the device is loaded onto the activation circuitry of the device, where the next state may be the same state the device is currently in, or a state different from the first state. The equilibrium of the device is shifted away from the next state, by making the data appear complementary to the true data for the next state. When the trapping field is removed or lowered, and a signal to start the transition is provided, the device moves to its new state and the trapping field is reapplied. The data can be made to look complementary by either loading the complements to the true data, or by reversing the polarity of the trapping field.

5 Claims, 3 Drawing Sheets

COMPLEMETARY RESET SCHEME FOR MICROMECHANICAL DEVICES

This application claims priority under 35 U.S.C. § 119 (e) (1) of provisional application Ser. No. 60/012,529, filed Feb. 29, 1996.

BACKGROUND OF THE INVENTION

1. Field of the Invention

This invention relates to the operation of micromechanical devices, more particularly to the activation and reset of such devices.

2. Background of the Invention

Micromechanical devices typically consist of miniaturized moving parts that are activated by electrical currents or fields. These moving parts range from gears and motors to movable mirrors and shutters. The control of the fields surrounding the parts allowing operation of these devices normally involves rather sophisticated underlying electronic circuitry.

One of the difficulties faced with micromechanical moving parts lies in the activation and movement of the parts. In the case of continuously moving parts, such as gears and motors, activation occurs when the necessary fields are applied to start the motion, supplied to keep the motion continuous and then removed to stop the motion. In contrast, a far different series of events takes place for those micromechanical devices that have stepped motions, such as the shutters and mirrors mentioned above.

These micromechanical devices become activated when they are acted upon by applied fields to start the part moving, the part moves and then it comes to rest. The time that they are transitioning from one state to another is called "flight" time. When operating a large number of these parts within the device, the flight time for each part must coordinate with the flight times of the other parts. Additionally, the reset of each part, where the part is released from its current state to prepare for the next state, must be coordinated among the parts.

These processes of synchronizing flight and reset times increase the controllability requirements of the device. Additionally, since each individual part comes to rest after flight, the necessary field forces required to overcome its inertia may be higher. This in turn increases the complexity of the activation circuitry. Both of these problems result in a more complex device that must be controlled very closely.

Therefore, some method is needed for the operation and control of micromechanical devices to decrease their flight time and to increase their controllability.

SUMMARY OF THE INVENTION

In one aspect of the invention either complementary data or the appearance of complementary data is used to assist in the reset process of micromechanical parts in which the parts are released from their current state to prepare for the next state. Fields are briefly set to shift the equilibrium to a state opposite to the next system state. This pumps energy into the system to prepare for the next state transition.

Either the activation process occurs with fields complementary to the fields corresponding to true data or the polarity of a trapping field (a field which holds the device in a resting state) is reversed, making the data appear complementary. The trapping field is then removed or lowered and the part transitions to its next state. The next state may be a state that is the same as the first state or a state different from the first state.

It is an advantage of the invention in that it increases the departure speed of a part moving to a next state that is different than its first state.

It is an advantage of the invention in that it decreases the departure speed of a part moving to a next state that is the same as its first state.

It is an advantage of the invention in that it increases the controllability of arrays of these individual devices.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

While the techniques described herein may be applied to all micromechanical devices, they are especially applicable to those devices that move in a stepped fashion, transitioning from one resting state to another resting state. These devices typically change states depending upon fields applied corresponding to incoming data. The discussion contained herein will focus on these types of devices, but is in no way intended to limit the scope of the claimed invention.

For example, the devices under discussion use electrical signals and electrostatic fields to activate the parts and then trap them. These activation fields and trapping fields in the devices under discussion are referred to as data and bias voltage. However, the use of these terms is in no way intended to eliminate the application of this invention to electrically controlled micromechanical devices in any way.

One type of these stepped devices that suffers from several operating constraints are micromechanical spatial light modulators. These types of devices typically comprise arrays of individually addressable elements used to form images. It is in the image-forming applications that these devices suffer the most constraints. In forming images from incoming video data, the modulator elements must be able to switch states at very high speeds. Additionally, in embodiments where these elements consist of mirrors suspended on hinges, they occasionally suffer from a condition called hinge sag, in which the hinges supporting the mirror do not return completely to their resting position, causing stray light to enter the imaging optics. Additionally, if these mirrors are activated such that they actually touch down onto another surface, the combination of sticking and friction (called stiction) can make the release (reset) of these parts difficult.

These elements are activated by electrical signals that cause them to assume a particular state by causing electrostatic attraction to build between the element and the activation circuitry. Reset refers to the process of releasing the element from its current state to prepare it to move to its next state. The elements are held in place between transitions from state to state by a trapping field, which in this case is a bias voltage.

Figure 1A:
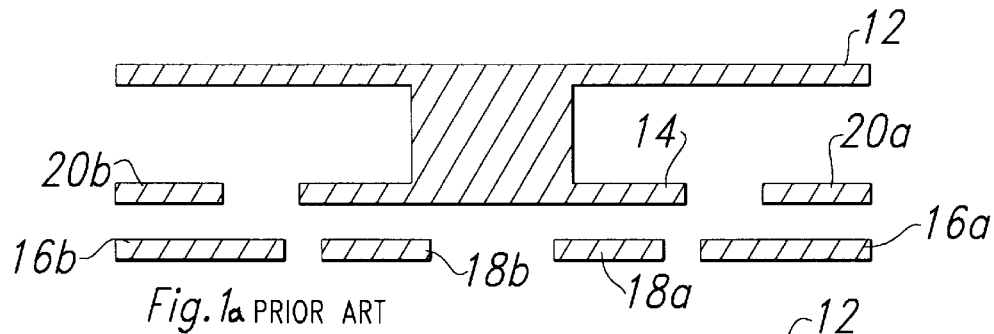
FIGS. 1a–b shows a cross-sectional view of a prior art micromechanical device that moves from one stable state to another depending upon the activation data.
Figure 1B:
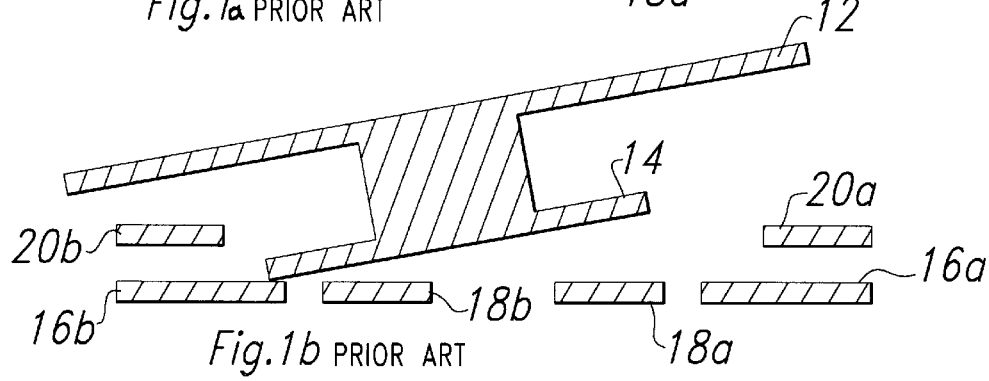

One example of such a modulator is the digital micromirror device (DMDT™), shown in FIGS. 1a–b. In FIG. 1a the modulator element is shown in its unaddressed state. The element comprises a mirror 12, supported over a yoke 14. The yoke 14 has hinges, not shown, that are in the plane coming out of the page in this view. The hinges allow the yoke 14, and therefore the mirror 12, to move about the axis of the hinges in response to activation signals.

The activation signals are provided on addressing electrodes 18a and 18b. When these electrodes are addressed, the electrostatic forces between the yoke 14 and one of the address electrodes builds up such that the electrostatic forces are unbalanced. This causes the yoke 14 to be attracted to whichever of the address electrodes is addressed. The result is of this attraction is shown in FIG. 1b. For this example, the electrodes are the activation circuitry for the mirror.

In this example, the address electrode 18b was addressed to cause the yoke 14 to be attracted to it. The yoke/mirror structure then deflects about the hinges towards address electrode 18b until the yoke comes into contact with landing electrode 16b. Additionally, a mirror stop or landing electrode 20b may be provided upon which the mirror rests after flying to its new state. At this point, the mirror has transitioned to a stable state, which in imaging applications is either the ON state, where light reflected off of the deflected mirror is directed to the imaging optics, or the OFF state, where light is directed away from the imaging optics.

The strength and balance of the electrostatic field is maintained through manipulation of various voltages. A prior art sequence and examples of voltage values that can be used to cause these transitions is shown in FIGS. 2a–h. In FIG. 2a, the mirror is in the state shown in FIG. 1b. In this example, this will be assumed to be the beginning of a new segment of data, such as a new frame in video applications. The mirror has a bias voltage upon it, $V_M$, which equals 20 volts. The activated electrode 18b has a voltage, $V_b$, which equals 0 volts. The opposite electrode 18a has a voltage, $V_a$, which equals 6 volts.

Figure 2E:
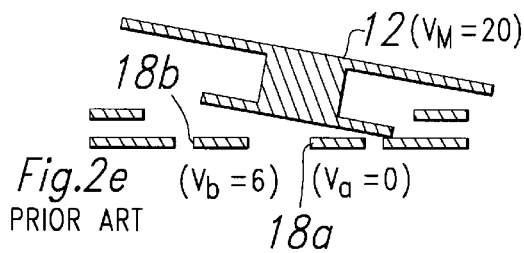
FIGS. 2a–h show a prior art sequence of a micromechanical device transitioning to states dictated by new data.
Figure 2A:
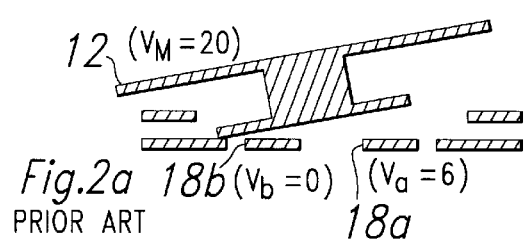
Figure 2F:
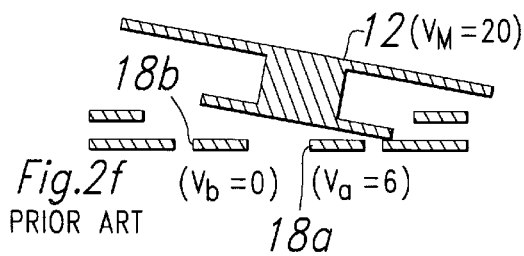
Figure 2B:
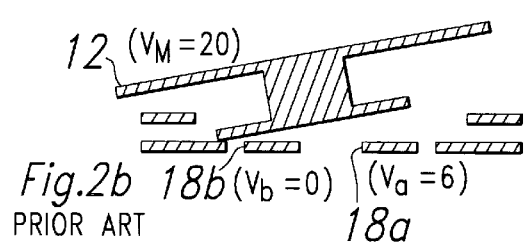

The voltages $V_a$ and $V_b$ remain the same in FIG. 2b, which is where the new data is being loaded for the next frame. In this case, the new data will require the element to stay in its same state. $V_a$ equals 6 volts and $V_b$ equals 0 volts. In FIG. 2c, the bias voltage, $V_M$, is dropped momentarily to 6 volts to allow the element to transition to its new state. Since the data is the same as that for the previous frame, the voltages $V_a$ and $V_b$ remain the same and the element should not move from its current state. However, there may be some movement of the element, as it can become momentarily unstable. In FIG. 2d, the momentary instability is eliminated when the bias voltage, $V_M$, is returned to 20 volts. This transition from old data to new data that is substantially the same as the old data will be referred to as a "same side" transition.

Figure 2G:
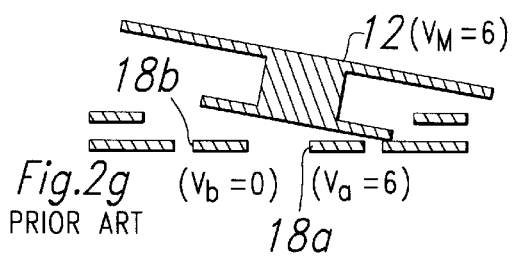
Figure 2C:
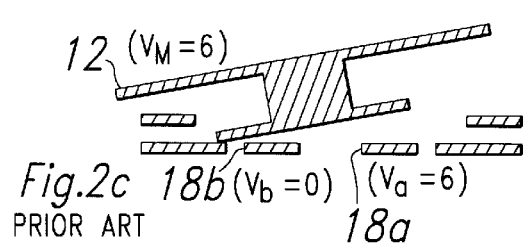
Figure 2H:
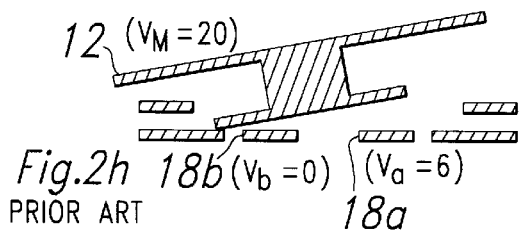
Figure 2D:
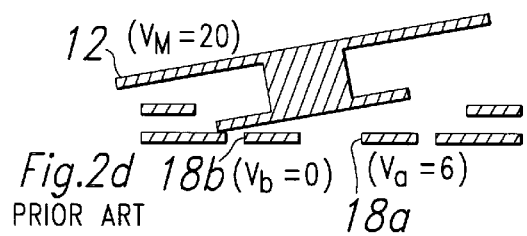

In FIGS. 2e–2h, the same sequence is performed for an element that changes state based upon the data loaded in the next frame. FIG. 2e shows the element deflected to the right (or "a") side. In this case, the activated electrode has a voltage, $V_a$, equaling 0 volts and the opposite electrode has a voltage, $V_b$, equaling 6 volts. In FIG. 2f, the new data for the next frame is loaded. Here the desire is to have the element change to the other state, so the voltage $V_b$ is set equal to 0 volts, the voltage $V_a$ equals 6 volts. In FIG. 2g $V_M$ drops momentarily to 6 volts, causing the mirror to release and transition to the left ("b") side. In FIG. 2h, $V_M$ is returned to 20 volts to stabilize the mirror. This transition from old data to new data that is different than the old data will be referred to as "opposite side" transition.

The electrostatic potential between the mirror and the address electrode can be shown in the following table.

| Image Update Step | Same side transition | | Opposite side transition | |
| --- | --- | --- | --- | --- |
| | Voltage | Force | Voltage | Force |
| Start of frame | 20 Volts | 400 Units | 20 Volts | 400 Units |
| Load data for next frame | 20 Volts | 400 Units | 14 Volts | 196 Units |
| Dropping bias | 6 Volts | 36 Units | 0 Volts | 0 Units |
| Reapply bias | 20 Volts | 400 Units | 20 Volts | 400 Units |

Operation of these devices at high speeds requires very fine control of each element in the array. The voltages which activate the elements into movement and then latch and stabilize them must be sent to the elements via signals. The time for these signals must be tightly controlled. If the bias or trapping voltage, voltage that latches the elements is dropped for too long of a period to allow the elements to transition, the elements release from their states and stray light enters the ON light path. If the bias voltage is dropped for too short a period, none of the elements will release and they will not change state to update the image.

Figure 3A:
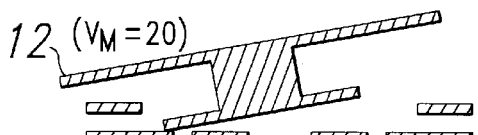
FIGS. 3a–h show one embodiment of an improved sequence for a micromechanical device transition.

In a first embodiment of the invention, the data appears to be reversed or complementary just prior to the momentary drop in the bias voltage, $V_M$. One example of this approach is shown in FIGS. 3a–h. In FIG. 3a, the element is shown at the start of a new frame to the "b" side. The mirror bias, $V_M$ is at 20 volts, and the address electrodes are $V_b=0$ and $V_a=6$ volts. The use of what appears to be of complementary data serves to shift the equilibrium of the device away from the next state.

The changing voltages serve to manipulate the electrostatic fields which control mirror movement and equilibrium.

Figure 3B:
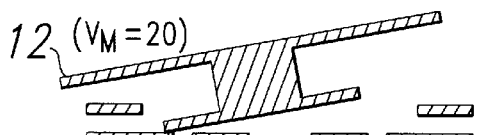
Figure 3C:
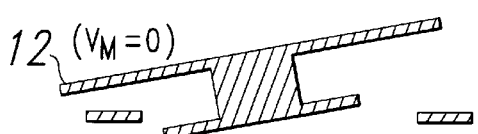
Figure 3D:
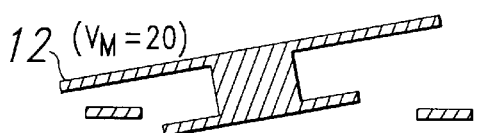

In FIG. 3b, the data for the new frame is loaded. Note that the data appears to be that for a opposite side transition as discussed in FIG. 2f, but is really for a same side transition. $V_b$ changes from 0 to 6 volts, and $V_a$ changes from 6 to 0 volts. In FIG. 3c, the mirror bias $V_M$ drops to 0 while the complementary data is on the address electrodes. Finally, in FIG. 3d, $V_M$ is reapplied and $V_b$ and $V_a$ return to their same side voltages of 0 and 6 volts respectively.

Figure 3E:
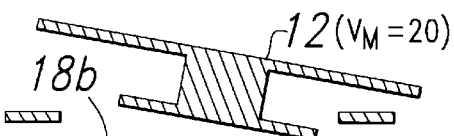
Figure 3F:
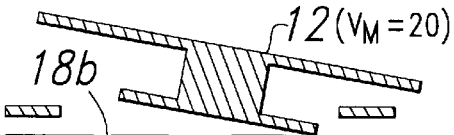
Figure 3G:
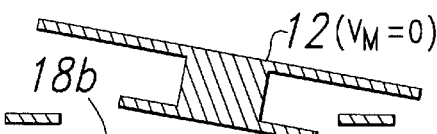
Figure 3H:
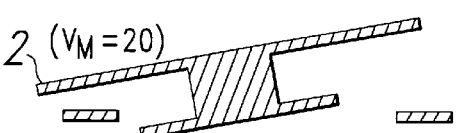

FIGS. 3e–3h show the voltage sequences for opposite side transitions. FIG. 3e shows the now expected voltages, with the side to which the mirror is deflected at 0 volts and the opposite side at 6 volts. During the data load for the next frame, those voltages remain the same, even though an opposite side transition is the desired operation. In FIG. 3g, $V_M$ drops to zero releasing the trap, which again causes the mirror to move to the side that has the 6 volts, which in this case is 18b. In FIG. 3h, $V_M$ is reapplied trapping the mirror and the voltages on the electrodes return to their previously expected levels.

Essentially, then, the data on the address electrodes appears to be complementary when the bias is removed. The data returns to the true values (where the true values are those that were used in the prior art embodiment in FIGS. 2a–2h) when the bias is reapplied. The advantages of this approach are that the departure speed of an element making the opposite side transition is increased, while the departure speed of an element making a same side transition is decreased. Recall that the same side transition would ideally have no transition at all, and therefore reducing the departure speed for same side limits the instability of the elements.

The effect on this complementary data method is summarized in the following table.

| Image Update Step | Same side transition force | Opposite side transition force |
|---|---|---|
| Start of frame | 400 Volts | 400 Units |
| Load data for next frame | 196 Units | 400 Units |
| Dropping bias | 36 Units | 0 Units |
| Reapply bias | 400 Units | 400 Units |

In the prior art embodiment, the difference in force between the steps of loading data for the next frame and dropping the bias was 364 units for same side, and 196 units for opposite side. In the above embodiment, the difference between the same steps is 160 units for same side and 400 units for opposite side. This results in the differences in the departure speeds discussed above. The end result of these changes is an increase in the controllability of the elements in the array. Additionally, the reset operation, in which the elements are pulsed to move them to their new states is more efficient because of the boost in the electrostatic forces.

Figure 5A:
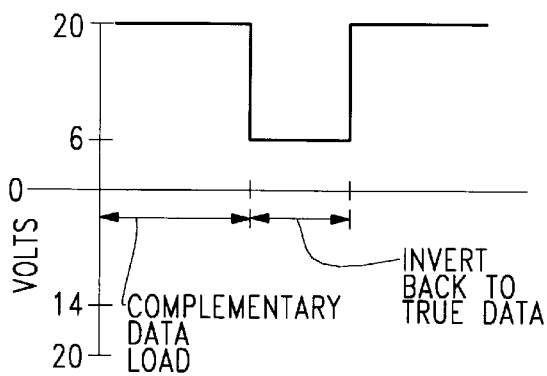
FIGS. 5a and 5b show examples of waveforms for the above embodiments of the invention.

The application of this complementary approach can be done in two ways. The first is what will be referred to as the complementary method, and was shown in FIGS. 3a–3h. In applying this method, the entire array of elements are loaded with complementary data, the bias is dropped, the true data is loaded onto the array and the bias is reapplied. A diagram of one example of a reset waveform for this embodiment is shown in FIG. 5a.

A second embodiment of this type of complementary addressing will be referred to as the bipolar method. In it, the true data is loaded on the array, and the polarity of the bias is reversed, then dropped, then reapplied at its original level. This second embodiment will be discussed with reference to FIGS. 4a–4j.

Figure 4A:
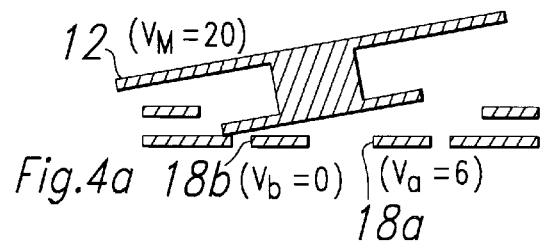
FIGS. 4a–j show a second embodiment of an improved sequence for a micromechanical device transition.
Figure 4B:
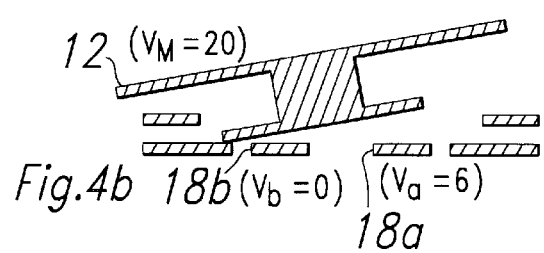
Figure 4C:
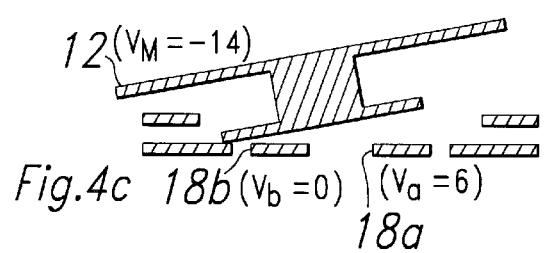
Figure 4D:
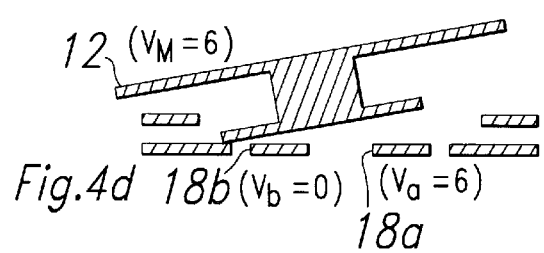
Figure 4E:
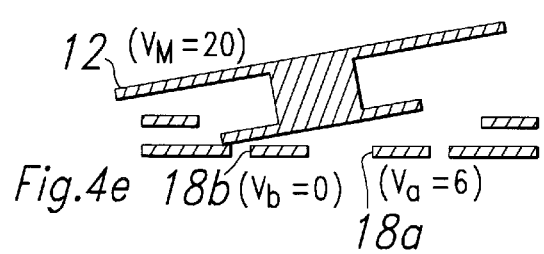

A same side transition using this embodiment is shown in FIGS. 4a–4e. In FIG. 4a the pixel is at the start of a frame, with the voltages at their expected levels. In FIG. 4b, the data is loaded for the next frame. In FIG. 4c, a previously unused step occurs, in which the bias on the mirror $V_M$ is reversed from 20 volts to –14 volts. In FIG. 4d, the vias is dropped to 6 volts. The reverse bias makes the data appear to be complementary just before the bias is dropped, as was done in the previous embodiment by actually using complementary data. When the bias is dropped, the same effect occurs. In FIG. 4e, the bias is reapplied at 20 volts.

Figure 5B:
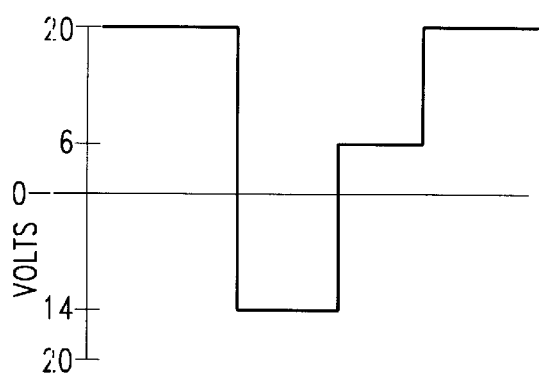
Figure 4F:
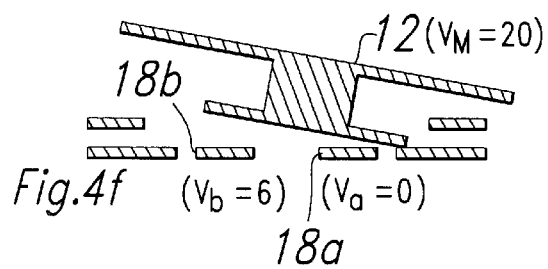
Figure 4G:
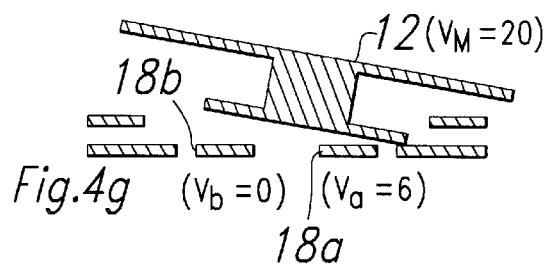
Figure 4H:
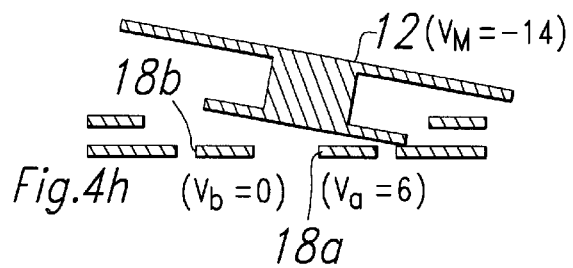
Figure 4I:
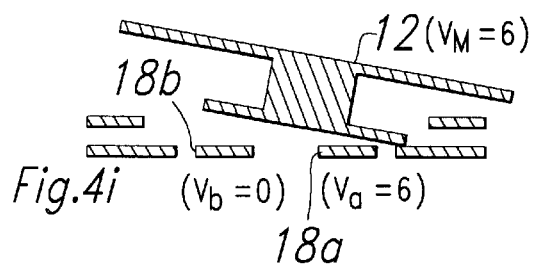
Figure 4J:
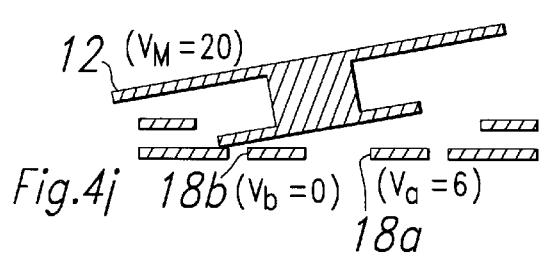

Opposite side transitions are shown in FIGS. 4f–4j. FIG. 4f has the voltages at their expected levels for a mirror deflected to the "a" side. In FIG. 4g the data for the new frame is loaded, so the voltages $V_b$ and $V_a$ are switched. When $V_M$ is reversed the mirror reacts to the data as being opposite what it will ultimately be such that when the bias drops in FIG. 4i, the mirror transitions to the new side. Finally, the bias is reapplied in FIG. 4j. One example of a reset waveform for this embodiment is shown in FIG. 5b. In this embodiment, the reverse of the bias serves to shift the equilibrium of the device away from the next state.

It must be noted that the above discussion has revolved around a particular set of voltage values and the transitions between two states, but is not limited to that situation. The relative values of the voltages are what is important, and the idea of loading either complementary data or reversing the bias to make the data appear complementary can be applied in other situations. For example, instead of address electrodes, the voltages could be applied to the activation circuitry of any number of micromechanical devices. The only limitation is that the micromechanical device must be addressed with data that either dictates a new state, and there can be more than one new state, or that dictates that no movement is necessary. Being able to load data that keeps the device in the same state would seem to be a disadvantage, except that when arrays of these types of devices are used, it simplifies the addressing if all devices are addressed, if they need to change state or not.

Similarly, the above discussion has focused upon the use of electrical signals and electrostatic forces. The same processes could be used by micromechanical devices that are activated and trapped by any type of field, including magnetic fields.

Thus, although there has been described to this point a particular embodiment for a method and structure for complementary addressing of micromechanical devices, it is not intended that such specific references be considered as limitations upon the scope of this invention except in-so-far as set forth in the following claims.

What is claimed is:

1. A method for operating a micromechanical device in a first state, comprising the steps of:

loading data for a next state of said device onto activation circuitry of said device, while holding said device in said first state by means of a trapping field;

manipulating fields to shift equilibrium opposite to said next state;

reducing strength of said trapping field on said device;

providing a signal which causes said device to transition to said next state; and reapplying said trapping field to hold said device in said next state.

2. The method of claim 1 wherein said manipulating step further comprises loading complementary data on said activation circuitry.

3. The method of claim 1 wherein said manipulating step further comprises reversing the polarity of said trapping field, thereby making said data appear to be complementary.

4. The method of claim 1 wherein said next state is a state substantially similar to said first state.

5. The method of claim 1 wherein said next state is a state different than said first state.

* * * * *